MECHANICALLY PROGRAMMED ENCODER SYSTEM
Filed Aug. 17, 1965 8 Sheets-Sheet 1
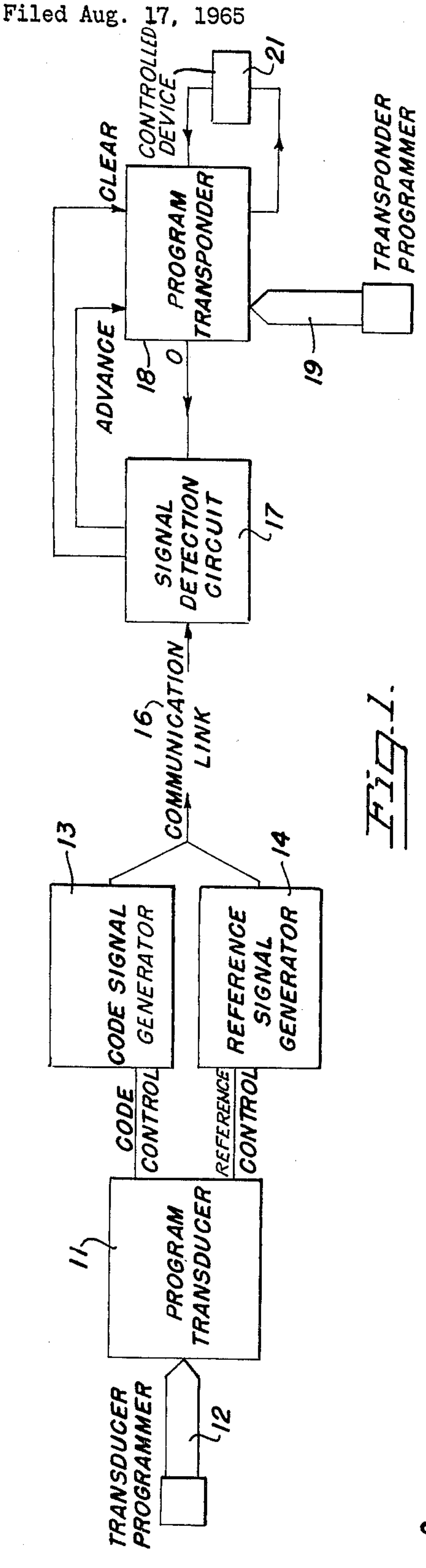
FIG. 1
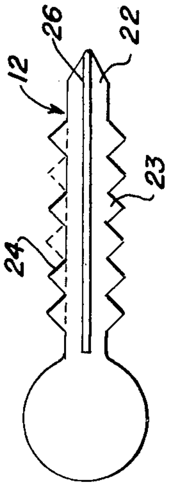
FIG. 2
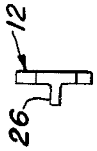
FIG. 3
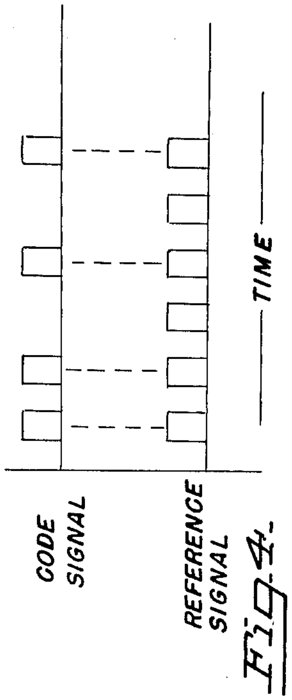
INVENTOR
KONRAD H. BENFORD
BY
Fryer, Tjensvold, Feix & Phillips
ATTORNEYS INVENTOR
KONRAD H. BENFORD
BY
Fryer Tjensvold Feix & Phillips
ATTORNEYS

MECHANICALLY PROGRAMMED ENCODER SYSTEM

Filed Aug. 17, 1965 8 Sheets-Sheet 3

INVENTOR
KONRAD H. BENFORD
BY
[signature]
ATTORNEYS

MECHANICALLY PROGRAMMED ENCODER SYSTEM

Filed Aug. 17, 1965 8 Sheets-Sheet 4

INVENTOR
KONRAD H. BENFORD
BY
Fryer Tjensvold Feix & Phillips
ATTORNEYS

INVENTOR
KONRAD H. BENFORD
BY
Fryer, Tjensvold, Feix & Phillips
ATTORNEYS

MECHANICALLY PROGRAMMED ENCODER SYSTEM

Filed Aug. 17, 1965 8 Sheets-Sheet 6

INVENTOR
KONRAD H. BENFORD

Fryer Tjensvold Feix Phillips

ATTORNEYS

INVENTOR
KONRAD H. BENFORD
BY
Fryer Tjensvold Feix & Phillips
ATTORNEYS

MECHANICALLY PROGRAMMED ENCODER SYSTEM

Filed Aug. 17, 1965 8 Sheets-Sheet 3

INVENTOR
KONRAD H. BENFORD
BY
Fryer, Tjensvold, Feix & Phillips
ATTORNEYS

United States Patent Office
3,500,326
Patented Mar. 10, 1970

3,500,326
MECHANICALLY PROGRAMMED ENCODER SYSTEM

Konrad H. Benford, San Francisco, Calif., assignor to Bowles-Benford, San Francisco, Calif., a joint venture of Henry Bowles and Konrad H. Benford Filed Aug. 17, 1965, Ser. No. 480,449
Int. Cl. H04q 3/00
U.S. Cl. 340—147 15 Claims

ABSTRACT OF THE DISCLOSURE

A mechanically programmed encoder system for selective control and/or identification wherein a transmitting portion of the system operates when activated to transmit an electrical signal which is the analog of a code represented mechanically on a programmer, to a receive portion of the system which is operatively associated with a device to be controlled and which responds to receipt of a code to operate such device if and only if the code which is received matches the code mechanically represented on a programmer operatively associated with the receive portion of the system.

The present invention relates to a mechanically programmed encoder system, and more particularly to a mechanically programmed encoder system for selective control and/or identification.

In the present invention a transmitter is provided for generating a code signal and a receiver is provided to receive signals and respond to a particular code signal to operate a controlled device. The invention provides an excellent identification system in that the receiver responds only to a particular code signal and thus the controlled device can be operated only after the received signal has been properly identified. Thus the receiver can be looked upon as a "lock" and the transmitter as a "key" in that the "lock" only "opens" the controlled device when the correct "key" has identified itself to the "lock."

The present invention, however, provides much more than an electronic "lock" and "key." The present invention teaches a system wherein a transmitter is mechanically programmed at will to transmit any one of several code signals, and the receiver is similarly mechanically programmed at will to respond to one of several code signals.

In the present invention all transmitters are virtually identical and thus are capable of being mass produced. Similarly, all receivers are identical, thus making it unnecessary during manufacture to separately equip each receiver with means which will distinguish it from every other receiver. While a transmitter of the present invention is capable of transmitting any one of a number of codes, it in fact only transmits the particular code which has been programmed into it. For this purpose a programmer is provided which is separate from the transmitter and which may be very similar in physical appearance to a conventional house key (with specific physical requirements of its own, however). The programmer is readily operatively associated with the transmitter whereby the transmitter becomes programmed to transmit that particular code established on that particular programmer. In almost the identical manner the receiver is physically programmed by a separate programmer to respond only to a given code (that code established on the programmer which is associated therewith) and thus the control device operates only in response to one particular code signal. Since a programmer can be operatively associated with a transmitter or receiver with no more difficulty than associating a key with a lock, it is possible to change at will the code signal which a transmitter transmits and the code signal to which a receiver responds. Thus the highly individualistic electronic devices taught by the present invention can be mass produced and thus manufactured at low cost putting the invention within the economic capabilities of a great many potential users.

The number of codes in a given set of codes can be very large (in the thousands for instance), and a given programmer can have established thereon any one of those codes. It is thus possible to create a highly selective receiver by simply associating therewith a programmer containing one of the many codes. Once associated with a programmer, a receiver will only respond to a code signal from a transmitter associated with a particular programmer. At any time that the particular code to which a given receiver is programmed to respond is compromised by having become known to someone not authorized to have that information, it is a simple matter to change the code to which the receiver responds by changing the programmer associated therewith.

Another feature of the present invention which makes it practical for use in a wide variety of applications is the minimal band width requirement attendant therewith in spite of the fact that the number of different possible code signals may be very large. Theoretically the number of codes in a given set of codes can be increased infinitely without increasing the basic band width requirements. By employing an embodiment of the invention which utilizes serial codes only, the necessary band width is that required to distinguish between signals of only two different frequencies. In one embodiment of the invention to be described, only one frequency need be identified.

Accordingly, it is an object of the present invention to provide a commercially practical identification and control system wherein a mechanically programmed transmitter transmits a code signal to a mechanically programmed receiver which only responds to a preselected code signal to operate a controlled device.

Further and more specific objects and advantages of the present invention are made apparent in the following specification wherein a preferred form of the invention is described by references to the accompanying drawings.

In the drawings:

FIG. 1 is a schematic block diagram functionally relating the several basic components of the present invention;

FIGS. 2 and 3 are a side view and end view, respectively, illustrating one form of a programmer for a transmitter;

FIG. 4 is a chart illustrating the code pattern of the programmer of FIGS. 2 and 3;

Figure 8:
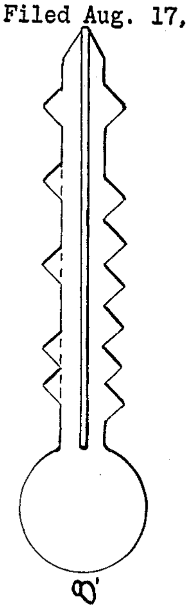
FIG. 8 illustrates a programmer similar to that shown in FIG. 5 but including additional program information.

Referring now to FIG. 1, a program transducer 11 receives a transducer programmer 12 and operates through a code signal generator 13 and a reference signal generator 14, to transduce the code information established on the programmer into a form suitable for transmission over a selected communication link 16. The communication link 16 leads to the receive portion of the system and more particularly to a signal detection circuit 17 which separates the code signal from the reference signal and directs them to a program transponder 18. The transponder is designed to receive a transponder programmer 19 which has code information established thereon. When the particular transponder programmer 19 which is operatively associated with the program transponder 18 has code information established thereon which properly corresponds to the information established on the transducer programmer 12, the systems on either side of the communication link 16 are equipped for co-operative operation. Assuming a transponder programmer and a transducer programmer which are a matched pair (have corresponding code information established thereon), the receipt by program transponder 18 of a signal from program transducer 11 results in the operation of a controlled device 21. If, on the other hand, the code signal which the signal detection circuit 17 forwards to the program transponder 18, does not correspond to the code established on the transponder programmer 19, the controlled device 21 will not be operated. Thus the program transponder 18 recognizes only that one code which is made an integral part of the transponder by the transponder programmer 19.

While the program transducer 11, code signal generator 13, and reference signal generator 14 form a transmitting system capable of transmitting any one of a number of codes, only that code established on a transducer programmer operatively associated with the program transducer 11 is transmitted. Thus, the transmitting portion of the invention is made highly selective by the addition of a particular transducer programmer. The actual transmitter, however, does not require any individual characteristic to distinguish it from other transmitters thus making it possible to manufacture transmitting systems according to the present invention on a mass production basis.

Similarly, the program transponder and signal detection circuit form the received portion of the present invention and are made highly selective by the addition of a transponder programmer 19. Thus, like the transmitting portion of the invention, the received portion of the invention can be manufactured on a mass production basis since distinguishing characteristics between received units are not required.

Although the general physical form of a transducer programmer 12 is not a vital part of the present invention, there are several physical requirements of a transducer programmer which must be adhered to. FIG. 2 illustrates one possible physical embodiment of a transducer programmer which is somewhat similar to a key. The programmer 12 includes a body portion 22 to which a series of reference elements 23 and a series of code elements 24 are affixed. The code elements 24 are removably secured to the body portion 22 for easy removal. Thus, if the programmer is formed from a plastic material, the base of each triangular shaped code element 24 is scored enabling easy removal of selected elements. The particular programmer illustrated in FIG. 2 has six code element locations with the second and fourth code elements (numbering from right to left) removed. Thus if the presence of an element at an element location is represented by a 1, and the absence of a code element at an element location is represented by a 0, the particular code established on the transducer programmer 12 of FIG. 2 is 101011. This particular code has been selected arbitrarily for purposes of illustration, and it is clear that any code between 000000 and 111111 can be selected by removing various combiations of code elements 24.

While the code elements 24 are absolutely necessary parts of the transducer programmer 12 (but not necessarily in the particular form illustrated) the reference elements 23 are not absolutely necessary, as will be explained in more detail below. The reference elements 23 are not designed for removal from the body portion 22, and thus each transponder programmer will include the six reference elements 23 at each of the six reference element locations (six being an arbitrarily selected number). Although the reference elements need not be an integral part of the programmer 12, reference elements will generally have to be provided in some form in order to determine at which code element locations code elements reside. Thus when the code elements and reference elements of programmer 12 are transduced into a train of pulses such as that shown in FIG. 4, it becomes possible to detect the particular code established by the code elements by comparing the code signal to the reference signal.

In order to establish an orientation to the programmer 12, one side of the body portion 22 has a projecting ledge 26 secured thereto. A groove in one side of the body portion 22 could serve equally to establish the proper orientation of the programmer such that when it is inserted into a keyway, the code elements and reference elements engage the proper transducing mechanisms.

Figure 5:
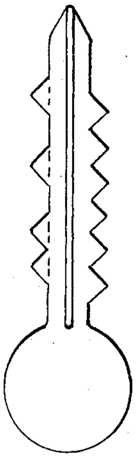
FIG. 5 is a programmer of the form shown in FIGS. 2 and 3, but with the program information arranged differently.
Figure 6:
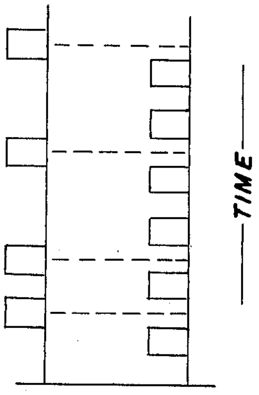
FIG. 6 is a chart illustrating the code pattern of the programmer of FIG. 5.

The code element locations of the programmer of FIG. 2 are in direct opposing relation to the reference element locations, such that when the elements are transduced into pulses each code element which is present at a code element location generates a pulse which occurs simultaneously with its associated reference pulse. In an alternative arrangement and one possessing certain advantages in particular circumstances, the reference element locations and the code element locations are longitudinally offset from one another such as shown on the transducer programmer of FIG. 5. FIG. 6 illustrates the pulse pattern corresponding to the arrangement of elements on the programmer of FIG. 5. As can be seen by a comparison of the charts of FIGS. 4 and 6, the code pulses produced by the programmer of FIG. 5 occur before their respective reference signal pulses rather than simultaneous therewith. The full significance of these apparently minor distinctions are made clear below wherein a description is set forth of the logic which is observed at the receive portion of the system.

Figure 7:
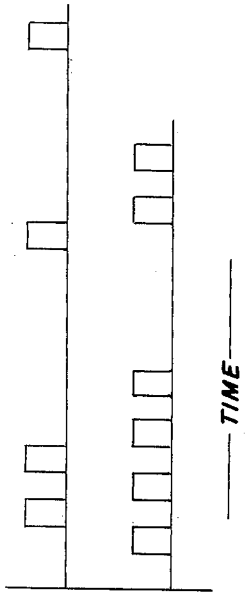
FIG. 7 is also a chart illustrating the code pattern of the programmer of FIG. 5, assuming non-uniform spacing between code signal pulses.

The charts of FIGS. 4 and 6 both illustrate the reference signal pulses as occurring at uniform time intervals. Since it is contemplated by the present invention that the signals may be manually generated (such as by inserting a programmer into a given slot) it is more realistic to expect non-uniform spacing between reference signal pulses, such as shown in the Chart of FIG. 7. Although the reference signal pulses are unevenly spaced, it is to be noted that the relationship between reference signal pulses and code signal pulses is maintained due to the fixed relationship between reference elements and code elements on the programmer. Thus the primary embodiment of the invention which relies on the presence of code signals relative to reference signals, and not on the occurrence of code signals in given time intervals, sets no requirements of uniformity as to the generation of a code signal.

Figure 9:
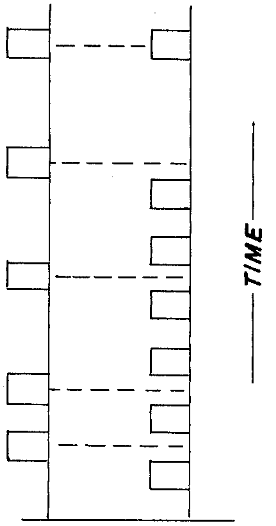
FIG. 9 is a chart illustrating the code pattern of the programmer of FIG. 8.

When the code elements of a programmer are offset from the reference elements (see FIG. 5), it is possible to establish a unique arrangement by having a code element and a reference element in direct facing relation. FIG. 8 shows a programmer wherein the leading reference element and code element are disposed to establish signal pulses simutlaneously (see FIG. 9) wherein the remaining elements are disposed such that code element pulses are generated before their associated reference pulses. The simultaneous occurrence of a code signal pulse and reference signal pulse creates a third condition (the other two being a reference signal pulse preceded by a code signal pulse and a reference signal pulse preceded by a reference signal pulse) which can be used as a command signal such as to clear the receive system and put it in a start position.

Figure 10:
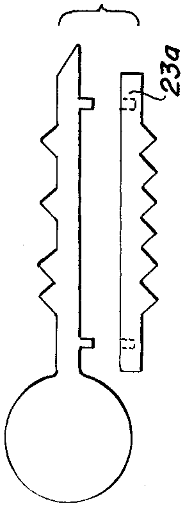
FIG. 10 illustrates a programmer carrying code signal information but not reference signal information.

As previously mentioned, the reference elements of a programmer are fixed and not removable whereby they do not serve in any way to distinguish one programmer from another. Accordingly, a programmer may comprise simply the code element portion as shown in FIG. 10, and be designed to combine with a reference element portion 23*a* which can be a permanent part of the program transducer 11.

Figure 11:
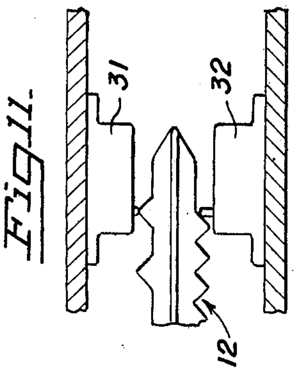
FIG. 11 illustrates in a generally schematic manner switch means for transducing the programmer information into an electrical switch.

The particular physical form taken by the mechanism which transduces the coded information on the programmer into a form suitable for transmission (transducer 11) depends largely on the physical form of the programmer itself. When a programmer carries coded information in the form of triangular projections, as previously discussed, it is possible to transduce that information into an electrical signal by using a pair of switches 31 and 32 as shown in FIG. 11. The switches are secured in opposing relationship such that when the programmer 12 passes between the switches, they are actuated by a code element location at which the element has not been removed. As the full length of the programmer is passed between the switches, the switches open and close in accordance with the code information, and thus make it possible to drive any type of known signal generator to produce the corresponding pulse patterns. The outputs of switches 31 and 32 relate to the outputs between transducer 11 and generators 13 and 14 as shown in FIGURE 1. By placing the actuators of switches 31 and 32 at the same longitudinal position, the relative positions of the code elements and reference elements are faithfully maintained and the resulting electrical pulses occur simultaneously with reference pulses or non-simultaneously with reference pulses, depending on the arrangement of the elements on the programmer. It will occur to those skilled in the art that the switches 31 and 32 can be so positioned that their actuators are disposed at different longitudinal positions such that a programmer having code elements and reference elements in direct facing relation will produce an electrical signal wherein the code pulses occur non-simultaneously with reference pulses. Since the particular arrangements of components or elements on a programmer depends largely on the particular use to which the system is being put, one arrangement cannot be categorically labeled as preferable to any other.

Figure 12:
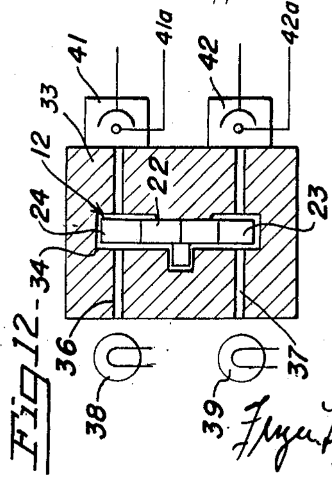
FIG. 12 illustrates in a generally schematic manner a photoelectric system for transducing the signal information established on a programmer into an electrical pulse signal.

FIG. 12 illustrates a totally different embodiment of transducer 11 for creating electrical pulse corresponding to the information established on a programmer 12. A generally opaque member 33 has a keyway 34 formed therein for receiving a programmer 12. Transversely intersecting the keyway 34 near one end is a transverse bore 36, while a similar transverse bore 37 intersects the keyway 34 near its other end. When the programmer 12 is inserted into keyway 34 its body portion 22 is disposed between the two bores 36 and 37, while code elements 24 project into the path of bore 36, and reference elements 23 project into the path of bore 37. Bore 36 has associated therewith a light source 38, while bore 37 has a light source 39 associated therewith. (A single light source for both bores can be substituted for the two separate light sources shown.) At the end of bore 36 opposite from that end at which the light source 38 is disposed, is a photoelectric device 41. A similar photoelectric device 42 is disposed at the end of bore 37 remote from the light source 39. The outputs 41*a* and 42*a* from these photoelectric devices correspond to the outputs from transducer 11 as shown on FIGURE 1.

When a programmer 12 is passed through the keyway 34, the light from source 38 to photoelectric device 41 is interrupted each time a code element passes therebetween. Similarly the light from source 49 to photoelectric device 42 is interrupted each time a reference element 23 passes therebetween. Thus, by passing the programmer through the keyway 34, the photoelectric devices establish a pulse pattern which reflects both the reference elements 23 and the code elements 24. Since the light sources 38 and 39 and their respective photoelectric devices 41 and 42 are at fixed longitudinal positions with respect to the keyway 34, the pattern of code elements relative to reference elements will be preserved in the pulse patterns which emanate from the photoelectric devices 41 and 42 whereby the program information is effectively transduced into electrical form.

If the light sources 38 and 39 are replaced by either pneumatic or hydraulic fluid sources, and the photoelectric devices 41 and 42 replaced by pneumatic or hydraulically operated valves, the program information is transduced into a pneumatic or hydraulic form. Thus, the present invention is not limited to operation as, or with, an electrical system.

Figure 13:
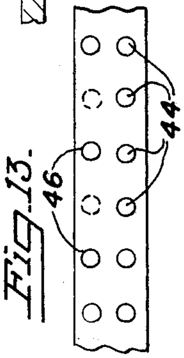
FIG. 13 illustrates a portion of a programmer having a physical form different than the programmers illustrated in FIGS. 2, 3, 5, 8 and 10.

While the switch arrangement as shown in FIG. 11 requires a programmer with projections, such as code elements 24 and reference elements 23, the same requirement does not exist for the transducer arrangement of FIG. 12. The programmer can have information established thereon in the form of holes as illustrated in FIG. 13, instead of projections. A set of lower holes 44 serve as reference elements, while a set of upper holes 46 serve as code elements. By providing a programmer wherein the code elements are circular areas which can be easily "punched-out" any particular code pattern can be selected. By passing the hole containing programmer through the key-way 34, the outputs from the photoelectric devices are pulse patterns corresponding to the hole patterns in the programmer.

The programmer of FIG. 13 suggests the use of other programmer media such as magnetic tape, magnetic ink, or other known information storage means together with known systems for transducing the information stored on such media into corresponding electrical signals.

Figure 14:
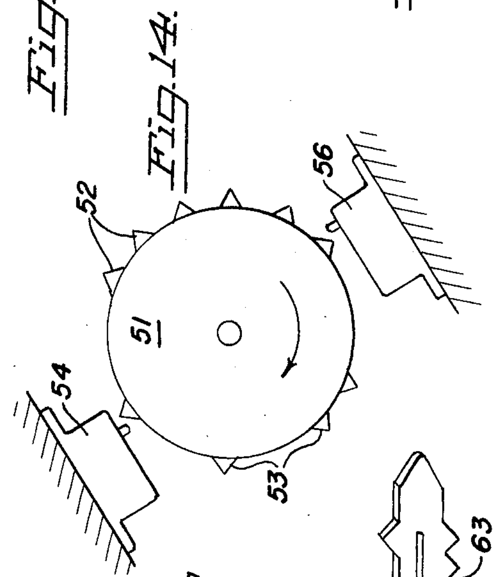
FIG. 14 illustrates in a generally schematic manner a programmer of circular configuration.

FIG. 14 illustrates a programmer 51 having a circular rather than linear configuration. The periphery of the programmer carries projections 52, which serve as reference elements, and removable projections 53 which serve as code elements. Switches 54 and 56 comprise transducer 11 and operate to tranduce the information established in the circular programmer into electrical pulses each time the programmer is rotated 180°. The output of the switches corresponds to the outputs of transducer 11 of FIGURE 1. The choice between a linear or circular programmer is dictated primarily by the requirements of an over-all system. For code sets having a large number of different codes (thus requiring possibly ten or more code element locations per programmer) it may be more practical to use a programmer having a circular configuration rather than a linear configuration to avoid programmers of impractical lengths.

Figure 15:
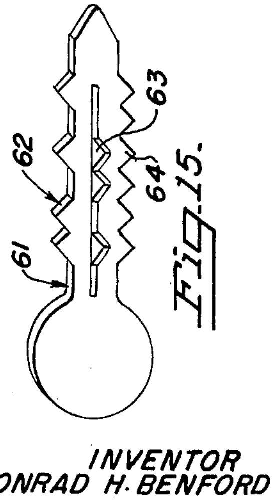
FIG. 15 is an isometric illustration of a programmer having two separate code sets.

When highly complex codes are desired, they can be achieved by using more than one set of code elements. FIG. 15 illustrates a programmer 61 having a first set of code elements 62 and a second set of code elements 63 in addition to a set of reference elements 64. For linear configurations this allows a greater code complexity for a given length of programmer, but has the drawback of increasing the band width requirements due to the necessity of having to distinguish between the frequency of signals generated by code elements 62 and code elements 63 as well as reference elements 64.

Since the number of different physical forms which a programmer or associated transducer can take is virtually without limit, the fact that a few of such forms have been described in some detail herein is not to be viewed as an attempt to set forth an exhaustive summary of all such forms.

Figure 16:
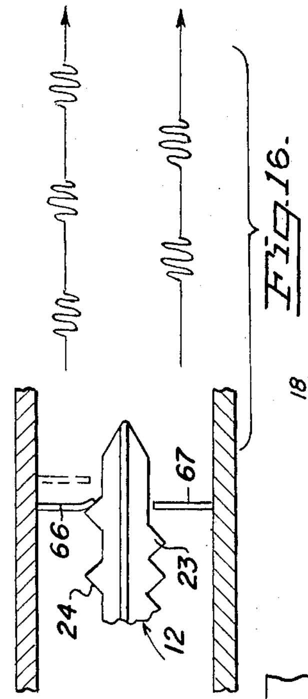
FIG. 16 illustrates in a generally schematic manner a system for transducing signal information established on a programmer into audio signals.

One further form of transducer 11 is worth describing due to some rather important advantages which it offers. FIG. 16 illustrates schematically a transducer which transduces the code and reference information on a programmer into audio signals which are represented as pulses of sound waves and which correspond to the outputs of code signal generator 13 and reference signal generator 14 of FIGURE 1. A sound bar 66 designed to vibrate at one frequency and a sound bar 67 designed to vibrate at a different frequency are disposed at a distance in facing relation to one another. When a programmer 12 is passed between the sound bars, the reference elements 23 and the unremoved code elements 24 engage the sound bars 67 and 66, respectively, producing audio pulse signals which correspond to the information established on the programmer. By transducing the programmer information into audio signals it becomes possible to employ already existing audio networks and thus take advantage of already existing facilities. Since only two different audio signals are involved, it is possible to produce two signals both of which fall within the band width of the telephone, for instance, thus making it possible to transmit programmer information over a telephone communication system. In addition to being able to use telephone lines, it is also possible to use the telephone subsets themselves. By generating the audio frequency signals into the mouth-piece portion of the subset, signals are transmitted to a distant subset (wherein the two subsets are communicated by the normal use of the telephone).

One use of such a system which suggests itself immediately is that of identification. If a caller wishes to establish to a called party that he, in fact, is "Mr. X", he can do so by requesting that the called party insert "Mr. X's" programmer into the identification receiver. The caller ("Mr. X") then generates a set of audio signals into the telephone mouthpiece and thus the speaker (earpiece) at the called party's subset. If the programmer generating the audio signals corresponds to that programmer placed in the receive portion of the identification system, an indication device is activated (such as a light) indicating to the called party that in fact "Mr. X" is on the line. One place where positive identification is of importance and would be useful is where credit is being extended to various people some of whom may not be able to personally appear to identify themselves.

The foregoing description explains how a small (pocket-size) transducer programmer can be physically realized and easily coded by non-technical means. In addition, means for transducing code information established on a programmer into electrical pulse trains, audio signals and other forms have also been carefully described. Whether or not the pulse trains which are established by the program transducer 11 (FIG. 1) are further transduced as by code signal generator 13 and a reference signal generator 14 depends on the nature of the communication link 16. If the distance between the program transducer and the program transponder is only several feet, the communication link 16 may be physically realized by electrical conductors and it may not be necessary to provide anything in addition to the switches 31 and 32 described in connection with FIG. 11. Where the communication line 16 however is physically realized by radio frequency transmission means, it is necesary to change the DC pulses created by a switch into radio frequency signals on a carrier signal and thus require a signal generator. Since all such transformations of form are well within the skill of the art, it is unnecessary to describe in detail either the means or the method for carrying out such results.

Each of the embodiments of transducer 11 operates to form pulse trains which represent the mechanical form of the code on its associated programmer and directs those pulse trains to generator means (13, 14 of FIGURE 1) for conditioning suitable for transmission.

Figure 17:
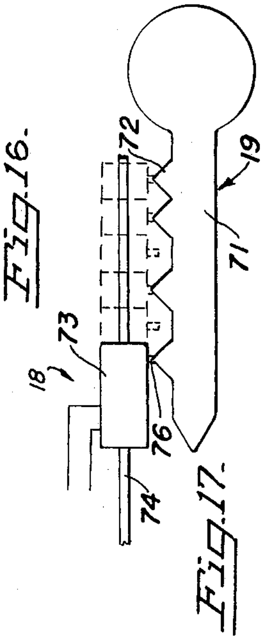
FIG. 17 illustrates schematically the portion of a receiver which determines the code to which the receiver responds.

Referring now to FIG. 17, a transponder programmer 19 includes a body portion 71 and a plurality of removable code elements 72 disposed at several code element locations. In order to establish a given code pattern, the necessary code elements 72 are removed in precisely the manner previously described with reference to the transducer programmer 12. It is the function of the transponder programmer to set a given code into the transponder 18 and limit the received signal which will operate the controlled device 21 (se FIGURE 1) that corresponding to the code established on the transponder. One means for determining whether or not a received signal corresponds to the code pattern established on a transponder programmer 19 includes a switch 73 movably disposed on a track 74 whereby the switch is capable of being positioned to several different locations along the track 74. The several locations at which the switch 73 can reside on the track 74 are selected to dispose the switch actuator 76 adjacent to an element location. By disposing the switch close to the transponder programmer its actuator is operated each time it comes to rest adjacent to an element location at which an element exists and its actuator is not operated when the switch comes to rest adjacent an element location from which the element has been removed. Thus by positioning the switch 73 along the track 74 each element position is interrogated by the switch 73 which translates its findings into an electrical quantity. By comparing the interrogation signals with the electrical signal received from the program transducer it is possible to determine if the proper correspondence exists between the received code and the transponder programmer code to enable the controlled device to be operated.

Figure 18:
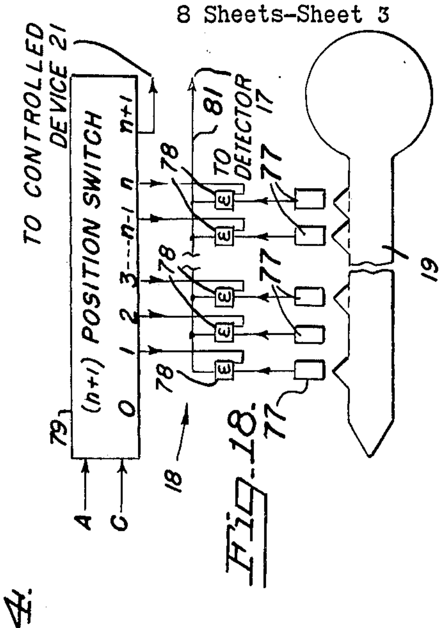
FIG. 18 is an alternate embodiment of a portion of the receiver which establishes the particular code to which the receiver responds.

FIG. 18 illustrates a different arrangement of components for producing essentially the same results as those described with reference to the components of FIG. 17. Instead of using the single interrogation means which moves from one element location to the next, the arrangement of FIG. 18 employs a separate element detector 77 for each element location. The detectors 77 have not been specifically illustrated as switches since they may in fact take any one of several forms. The detectors may be photoelectric cells, magnetically responsive components, any one of several different kinds of switches, etc. Thus, the elements 77 are simply referred to as detectors to avoid any implication that the invention is limited to a specific type of program code transducer.

Each detector 77 is electrically joined to a separate AND gate 78 while each AND gate is electrically connected to one position of a $(n+1)$ position switch 79. The $(n+1)$ position switch 79 provides one input to each of the AND gates 78 while the detectors 77 provide the other input. The output of each AND gate is connected to a conductor 81. When the $(n+1)$ position switch is in its "1" position, a signal is directed to the AND gate connected at that position, and to that AND gate alone whereby the code element location associated with that detector is interrogated. If the detector 77 which is also connected to that AND gate, provides a signal in response to detecting a code element, then both inputs to the AND gate carry a signal and the AND gate establishes an output signal which is directed to the conductor 81. The conductor 81 corresponds to the output of transponder 18 leading back to detector 17 (see FIGURE 1) for the purpose of comparing the interrogation results with the signal received at detector 17 as explained in detail below in connection with FIGURES 20–23. If the detector 77 on the other hand is adjacent to an element position from which the element has been removed, then only one input to the associated AND gate carries a signal and an output signal is not directed to the conductor 81. By sequentially moving the switch 71 from one position to the next, each element position of the transponder 19 is interrogated and the results of the interrogation are compared with the signal being received by the transponder to determine whether or not the code established on the transducer programmer generating a signal from the program transducer corresponds to the code established on the transponder programmer associated with the transponder.

The $(n+1)$ position switch 79 reaches its $n$th position only after it is established that correspondence exists between the transponder programmer and the transducer programmer at each code element location. When this occurs, the switch is advanced to its $(n+1)$ position which carries an electrical signal which results in controlled device 21 (see FIGURE 1) connected to the position being operated. At any time, however, that the signal or absence of a signal on conductor 81 does not correspond to the signal being received by the transponder, the $(n+1)$ position switch is prevented from advancing further and in most instances is reset back to its "0" position. The A input to the switch corresponds to the ADVANCE input of FIGURE 1 and positions the switch to the next location for interrogation when pulsed.

Whether a single multi-position interrogator such as that shown in FIG. 17 is employed or a plurality of fixed interrogators such as that shown in FIG. 18 is employed is not crucial to the present invention nor is the particular physical form of the particular interrogators. What is important to the present invention is that means are provided for interrogating each code element position so that the element code pattern of the transponder programmer can be compared with the serial code signal which is being received and which identifies the transducer programmer at the transmit portion of the system. Once each element position of the transponder programmer has been interrogated and found to correspond to the associated element position of the transducer programmer, the controlled device is allowed to operate. At any time, however, that non-correspondence between an element location on the transponder programmer and an element location on the transducer programmer is detected, the transponder is prevented from being positioned to that unique condition that allows the controlled device to be operated.

While it has been indicated to this point that the controlled device is operated only after the last code element has been interrogated and found to correspond to the last code element of the transducer programmer, this is not a necessary condition. The controlled device can be operated when the $(n+1)$ position switch reaches the $(n-1)$ position, for instance, with the last two detectors 77 being connected to the $n$ and the $(n+1)$ position of the switch. Thus, once correspondence is established to the $(n-2)$ position of the switch, the switch is advanced to its $(n-1)$ position which results in the controlled device being operated. Correspondence at the $n$ and $(n+1)$ positions is looked for to either operate the controlled device in one of several possible modes or else operate additional controlled devices.

Figure 19:
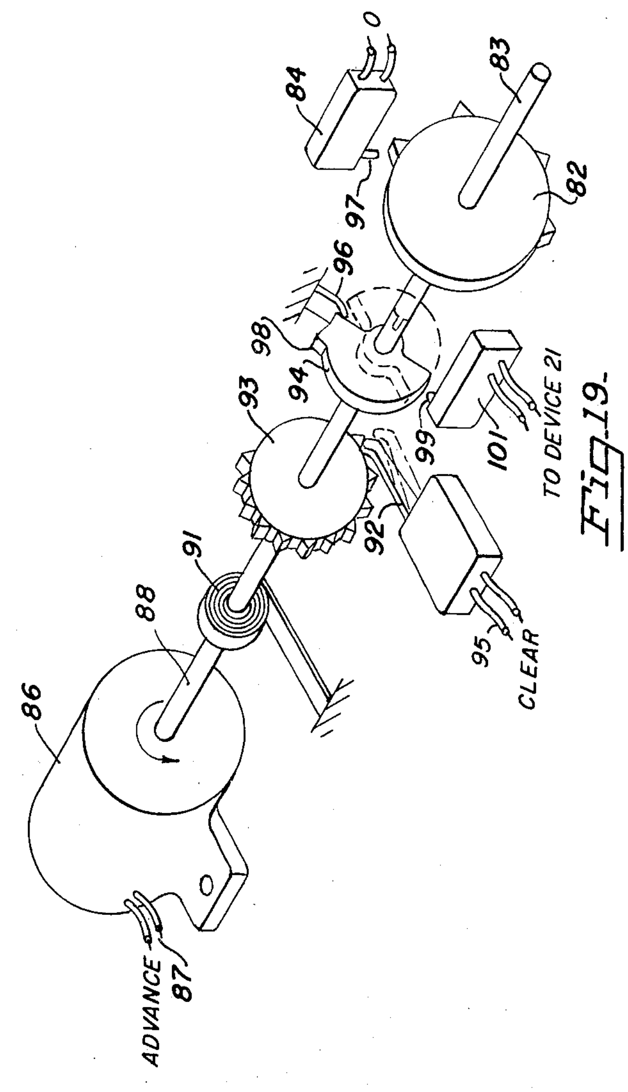
FIG. 19 is an isometric, semi-schematic illustration of a receiver with a particular programmer operatively associated therewith.

FIG. 19 illustrates in semi-schematic form a transponder system wherein the transponder programmer 82 corresponding to programmer 19 of FIGURE 1 has a circular configuration and is mounted on a shaft 83 for rotation past a switch 84 which is fixed in one position and which acts as a portion of detection circuits 17 (see FIGURE 1). The entire system is driven by a rotary solenoid 86 which advances the transponder from one element location to the next and which has an input which corresponds to the ADVANCE input of transponder 18 of FIGURE 1. Solenoid 86 responds to an input signal pulse on conductors 87 to rotate a shaft 88 counterclockwise a portion of one revolution. The shaft 83 is joined to shaft 88 for rotation therewith when the programmer 82 is operatively associated with the transponder. The shaft 88 carries a spring 91 which urges the shaft in a clockwise direction. The spring 91 is normally prevented from actually rotating the shaft 88 in a clockwise direction by a pall 92 which engages a ratchet 93 carried on the shaft 88. The pall 92 is solenoid operated whereby a pulse received by the conductors 95 operates to withdraw the pall from the ratchet (as shown in phantom) which releases the ratchet 93 and allows the spring 91 to rotate the shaft 88 in a clockwise direction. In this way the system is cleared and thus the input conductors 95 correspond to the CLEAR input of transponder 18 of FIGURE 1. The extent of the rotation of shaft 88 by spring 91 is limited by a control device actuation disc 94 which establishes the systems zero, or start, position when it engages a fixed stop member 96.

Each time the solenoid 86 receives an "advance" signal, it rotates in the counterclockwise direction a distance equal to the space between element locations on the transponder programmer 82. The actuator 97 of switch 84 is disposed to engage the code elements of programmer 82 when they are rotated to an interrogate position. If a code element has been removed from a particular code-element location, the actuator 97 is unacted upon when that particular code element location is rotated to the interrogate position. Thus, each time the solenoid 86 rotates the shaft 88 and thus the shaft 83, the disc 82 assumes a new position and the switch 84 interrogates a new element location. The output of switch 84 corresponds to the output O of transponder 18 of FIGURE 1 and provides an electrical condition which can be compared with the code signal received by detector 17. As the disc 82 is rotated so also is the disc 94. After the last code element location has been interrogated and found to correspond to the signal being received by the transponder system, the shaft is rotated one additional increment which results in an actuator 98 secured to the disc 94 engaging the actuator 99 of a switch 101 which is joined to and operates the controlled device 21 (see FIGURE 1). Thus, once all of the element locations on the programmer disc 82 have been interrogated and have been found to properly correspond to the incoming signal, the controlled device is operated.

If any of the code-element locations are interrogated and a non-correspondence is detected, however, a signal is generated as a result of that non-correspondence (see discussion below relative to FIGURES 20–23) and directed to the conductors 95 leading to the solenoid operated pall 92. This signal operates the solenoid which withdraws the pall from the ratchet 93 and allows the spring 91 to return the system to its zero position. Accordingly, only a signal transmitted by a properly coded programmer being operatively associated with a transducer can operate the controlled device.

While the transponder described above with reference to FIG. 19 illustrates a predominantly mechanical embodiment, a purely electronic transponder is equally obtainable as suggested by the description with reference to FIG. 18.

Figure 20:
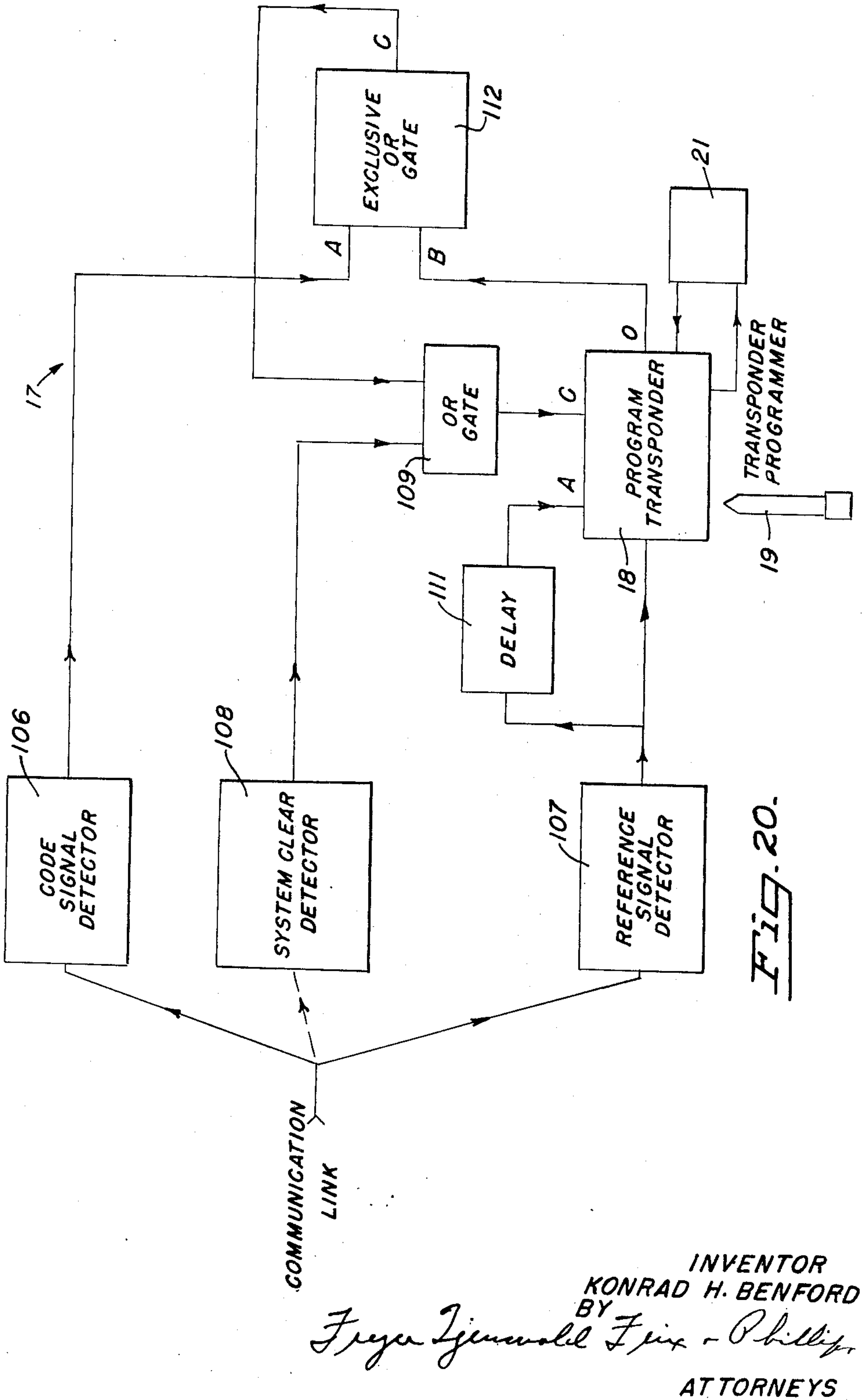
FIG. 20 is a block diagram illustrating the arrangements of basic components of a receiver system.

Referring now to FIGS. 1 and 20, the communication link 16 delivers signals to signal detection circuit 17 which may comprise those circuit components shown in FIGURE 20 with the exception of transponder 18, transponder programmer 19 and device 21. The signal is received initially by a code signal detector 106 and a reference signal detector 107 and in certain systems a system clear detector 108. Signals to the system clear detector 108 may be generated internally at the receive portion of the system or may come from the communication link, depending on the particular overall system being used. The code signal detector 106 detects code signal pulses when they occur and generates an output signal for each such code signal pulse received. Similarly the referenced signal detector 107 provides an output each time a reference signal pulse is detected.

The system initiates operation with a signal from the system clear detector 108 to an OR gate 109 which has an output that leads to the C input of the program transponder 18. A signal at the C input causes the transponder to assume its zero, or start, position. Since the OR gate 109 will establish a signal at its output when a signal is presented on either of its inputs, the signal from the system clear detector 108 results in the program transponder being cleared to its start position.

The first reference pulse carried by the communication link 16 and detected by the reference signal detector 107 may or may not have a corresponding code pulse, depending on whether or not a code element is present at the first code element location. The reference pulse is directed from the detector 107 to program transponder 18 and a delay 111 which leads to the A (Advance) input of transponder 18. The delay 111 operates to delay the advancing of the program transponder 18 for a prescribed length of time. The signal to transponder 18 interrogates the programmer 19 and causes a signal to occur at output O if a code element is detected. During the delay time an EXCLUSIVE OR gate 112 compares the signal from the first element location of the transducer programmer and the signal from the first element location of the transponder programmer. The O output of the program transponder leads to the B input of the EXCLUSIVE OR gate 112 and carries a signal for a duration determined by the signal from detector 107 to transponder 18 if and when the transponder is interrogating a code element location containing a code element and does not carry a signal when the transponder is interrogating a code element location at which the element is not present. Thus if the first code element location of the transducer programmer 12 does not carry a code element the code signal detector will not detect a signal and thus the A input of the EXCLUSIVE OR gate 112, to which the code signal detector 106 directs its output, will not receive a signal. If we assume that correct correspondence exists between the transducer programmer and the transponder programmer then the O output of programmer transponder 18 will also be without a signal established thereon and thus both the A and B inputs to the EXCLUSIVE OR gate 112 will be inactive.

Similarly, if both the transponder programmer and the transducer programmer have code elements located at their first code element locations, then the code signal detector 106 will detect a pulse and present it at the A input of the EXCLUSIVE OR gate 112 and the O output of program transponder 18 will also carry a signal and direct it to the B input of the EXCLUSIVE OR gate 112.

The EXCLUSIVE OR gate 112 is designed to establish a signal at its output C only when there is a signal at input A or at input B, but not when there is a signal at both input A and input B. Thus, as long as there is correspondence between the interrogated locations of the transducer programmer and the transponder programmer the same conditions will exist at the two inputs of the EXCLUSIVE OR gate 112 and there will not be an output therefrom. If, however, a signal should appear at either input A or input B of EXCLUSIVE OR gate 112 without a similar signal at the other input, then a signal is established at the output thereof and the signal is directed to the input of OR gate 109. As previously described, the OR gate 109 responds to a signal at either of its inputs to establish an output signal which results in the program transponder 18 being cleared to its start position. Thus at any time that a lack of correspondence is detected between the transducer programmer and the transponder programmer as evidenced by a signal at only one of the inputs to OR gate 112 (a non-identical condition existing at the inputs), the transponder will be cleared and prevent the transponder from reaching the position which results in the controlled device 21 being operated.

After the first code element locations have been compared by the gate 112, the reference pulse from delay 111 is presented to the A input of program transducer 18 which advances the transducer to its next position whereby the next element location is interrogated for comparison with the signal from the second code element location of the transducer programmer. Thus the program transducer is sequentially advanced in synchronism with the presentation of reference pulses which assures that the comparison which takes place at the OR gate 112 is between corresponding code element locations of the transponder programmer and the transducer programmer.

Figure 21:
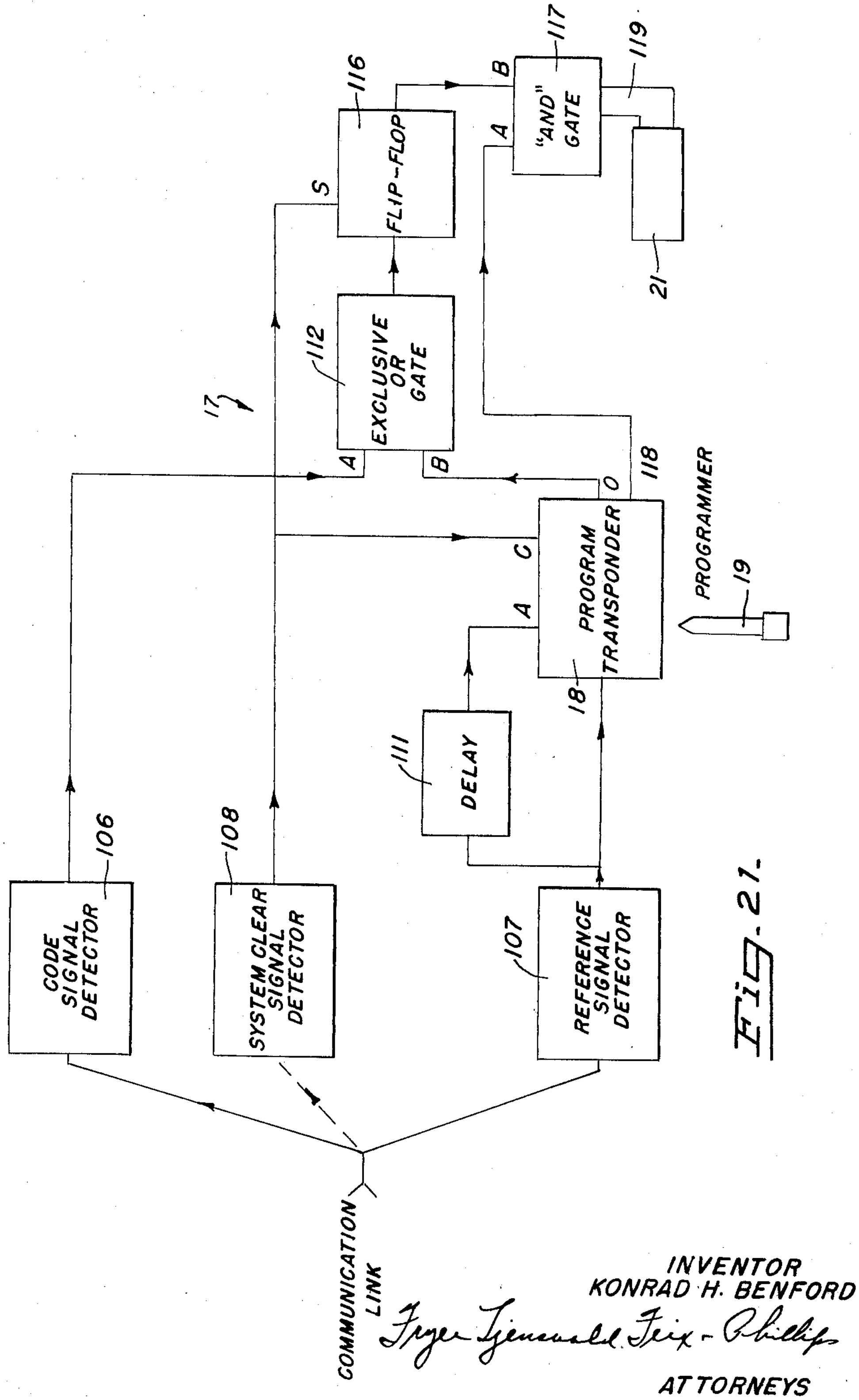
FIG. 21 is a block diagram illustrating an alternate arrangement of the basic components of a receiver system.

The system of FIG. 21 is very similar to that of FIG. 20 with the exception that a non-corresponding condition does not necessarily result in the program transducer 18 being cleared but instead results in a condition which makes it impossible to activate the controlled device 21. Thus, the OR gate 109 (see FIG. 20) is replaced by a flip-flop circuit 116 and an AND gate 117. The flip-flop circuit 116 is disposed to receive system clear signals from detector 108 and respond thereto by being placed in a set condition. When flip-flop 116 is in a set condition it establishes a signal at its output which is directed to one of the two inputs to AND gate 117. If a non-corresponding condition between the interrogation signal and the input signal is detected, the EXCLUSIVE OR gate 112 produces an output which is directed to an input of the flip-flop circuit 116 which results in the circuit being cleared to its re-set condition which removes any signal from the output of the circuit.

When the program transponder 18 has been advanced to the position which corresponds to operation of the control device 21, a signal is established at the output 118 of transponder 18 which leads to one of the inputs to AND gate 117. The output of AND gate 117 leads to the control device 21 via conductors 119 and operation of the controlled device is initiated by a signal on the conductors 119. The AND gate 117 is designed to produce an output at conductors 119 only when a signal appears at both of its inputs A and B. Thus, if at any time before the program transponder 18 reaches that position which corresponds to operation of control device 21, a non-corresponding condition is detected, the flip-flop circuit 116 is cleared and no input signal appears at the B input of AND gate 117. Thus, even if transponder 18 is subsequently advanced to the proper position for operation of the controlled device 21, it will not be operated since a signal at the A input of AND gate 117 without a signal at the B input is not enough to produce a signal on the conductors 119. Since the flip-flop 116 can only be placed back into a set condition by initiating a signal from the system clear signal detector 108, the logic of this particular embodiment requires not only that the proper code be detected by the program transponder 18, but also that the code be detected immediately after a system clear signal is detected and before any intervening, non-corresponding signal is presented to the transponder. Since this embodiment does not automatically return the transponder to its cleared position in response to a non-corresponding signal the system clear signal becomes part of the code which must be known before the device 21 can be operated.

While the systems described above with reference to FIGS. 20 and 21 represent operable systems, they have been presented primarily to disclose the basic logic of the receive portion of the invention and without further components pose some rather stringent timing requirements in order to preclude erroneous operation. The systems disclosed below with reference to FIGS. 22 and 23 add certain components to the already described systems and in doing so eliminate the need for precise timing and thus are more readily converted into practical systems.

Figure 22:
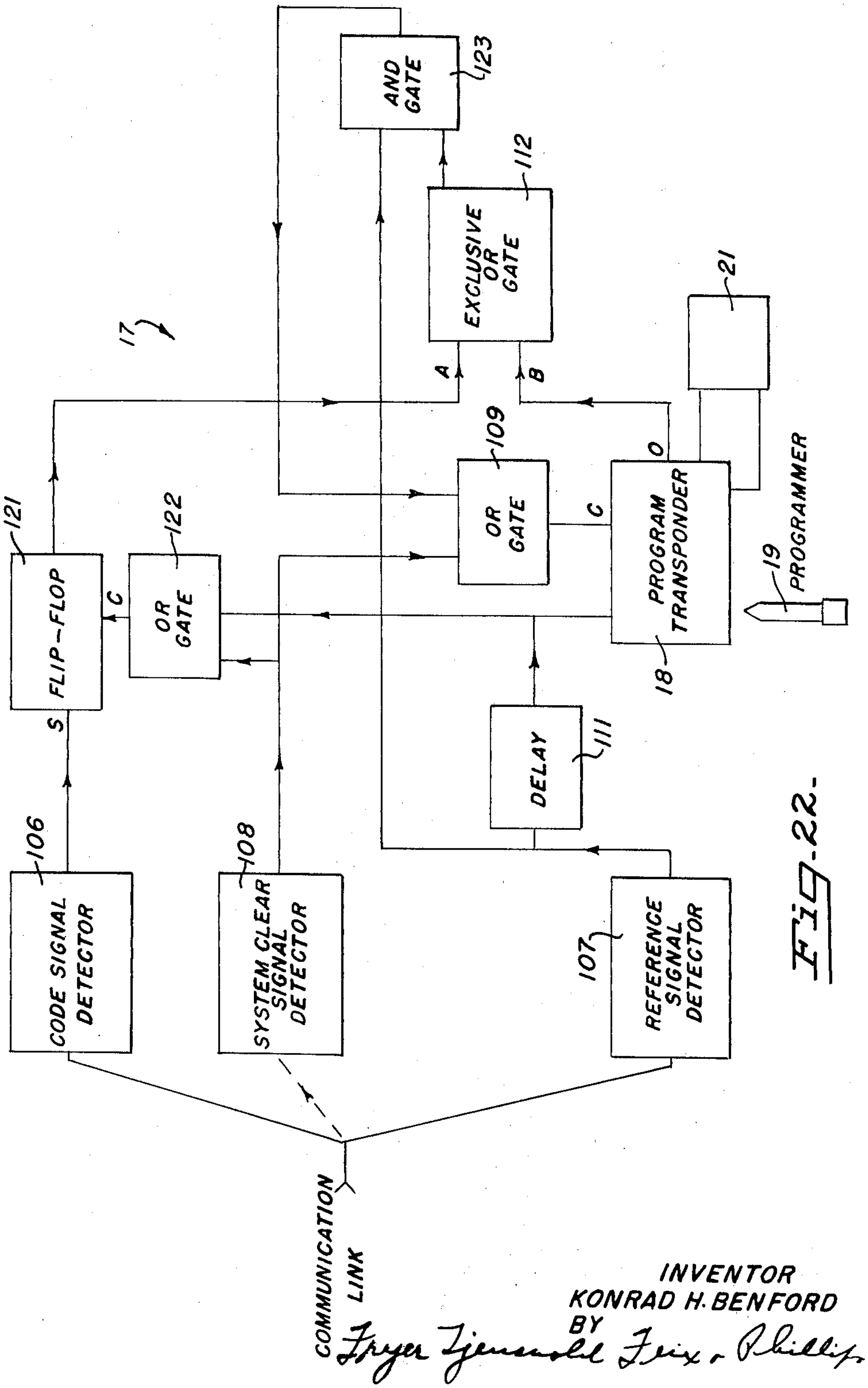
FIG. 22 is a block diagram illustrating a receiver system having components in addition to the basic components.

Referring to FIG. 22, the code signal detector 106 directs its output to a flip-flop circuit 121 which responds to a signal from detector 106 by assuming its set condition. When flip-flop 121 is in its set condition, it operates to establish a signal at its output which is directed to the A input of EXCLUSIVE OR gate 112. An OR gate 122 is disposed to receive input signals from both system clear signal detector 108 and delay 111 and is responsive to an input signal from either of such sources to produce an output signal which is directed to the flip-flop 121 and which is effective to clear the flip-flop from its set to its reset condition. Thus, when operation of the receive circuit is initiated a system clear signal from detector 108 is directed to OR gate 122 which clears the flip-flop 121 and thus removes any signal which may have existed at the A input of EXCLUSIVE OR gate 112. The signal from detector 108 is also directed to OR gate 109 which responds thereto to establish a signal at the clear input of program transponder 18 which results in the transponder being conditioned to its start position.

An AND gate 123 is disposed to receive any signal established at the output of EXCLUSIVE OR gate 112 as well as signals established at the output of reference signal detector 107. When both inputs to AND gate 123 carry a signal, an output signal is established which is directed to the OR gate 109 which results in the program transponder 18 being cleared. By having the output of EXCLUSIVE OR gate 112 operative only during the time AND gate 123 receives a signal from reference signal detector 107, it is possible for the inputs of EXCLUSIVE OR gate 112 to receive signals at different times without an erroneous indication of non-correspondence occurring. All that is required is that the inputs to EXCLUSIVE OR gate 112 correctly reflect the conditions at the code element locations being interrogated during the duration of the output signal from the reference signal detector. Thus if the program transponder should interrogate a given code element location and respond to the presence of a code element by establishing a signal at input B to EXCLUSIVE OR gate 112 before the flip-flop 121 is set by a signal from code signal detector 106, a signal will occur at the output of the EXCLUSIVE OR gate. Assuming this occurs prior to receipt of a reference signal pulse by the reference signal detector 107, the output from the EXCLUSIVE OR gate 112 will not be effective to clear the program transponder 18 since the absence of a signal from detector 107 to AND gate 123 prevents a signal from being established at the output of that gate. Since code pulses will be presented to the receive circuit either simultaneous with or prior to their associated reference pulses, the flip-flop 121 will be set and the A input to EXCLUSIVE OR gate 112 will have a signal established thereon at the same time as, or prior to, the reference signal detector 107 providing a signal to AND gate 123. Thus the AND gate 123 eliminates the requirement that the signal pulses presented to the inputs of EXCLUSIVE OR gate 112 be in complete time correspondence.

The flip-flop 121 operates to maintain a signal at the A input of OR gate 112 for a prescribed duration not necessarily dependent on the duration of the code signal pulse itself. The flip-flop 121 remains set in response to a signal at its input until the reference signal pulse from delay 111 operates to clear the flip-flop. Thus, the addition of AND gate 123 and flip-flop 121 operate to greatly reduce the precision with which signals must be presented to the inputs of OR gate 112.

Figure 23:
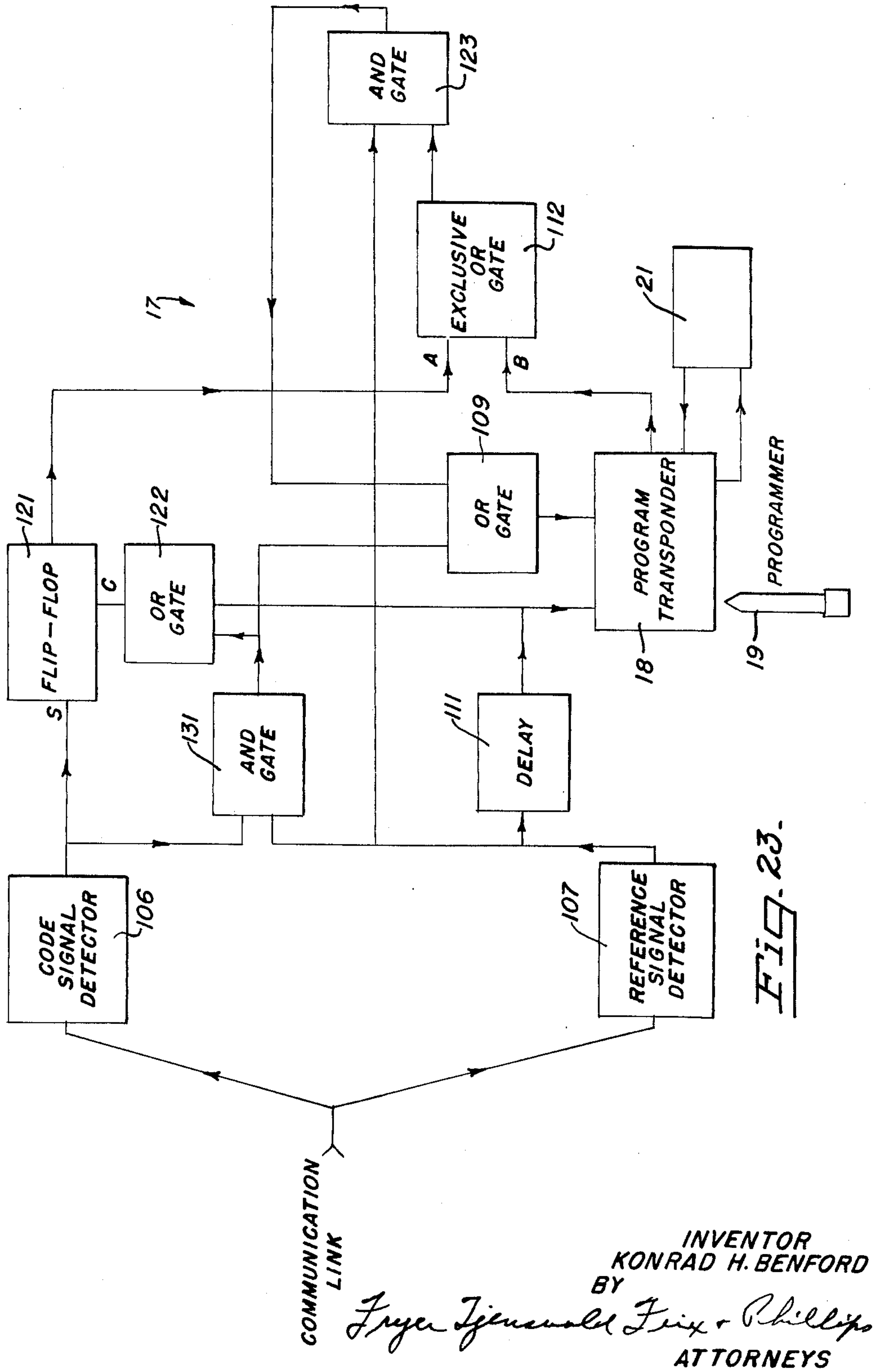
FIG. 23 is a block diagram illustrating a receiver system with refinements in addition to those shown in FIG. 22.

FIG. 23 illustrates a system which is designed to respond to the simultaneous occurrence of a reference signal pulse and code signal pulse by clearing the transponder 18. The system is made to respond in this manner by disposing an AND gate 131 to receive the outputs of both code signal detector 106 and reference signal detector 107. When both inputs to the AND gate carry a signal at the same time the AND gate establishes an output signal which is directed to OR gate 109 which as previously described operates to clear the transponder 18 to its start position. By employing a system wherein reference pulses and code pulses are non-simultaneous in their occurrence, the AND gate 131 will not produce an output signal during the normal decording of a signal and thus the remaining operation of the system is identical with that previously described with reference to FIG. 22.

Those embodiments of the present invention which have been described above all contemplate a system wherein reference signals are generated at the transmitting portion of the system and communicated over the communication link to the receive portion of the system for use as described. Where the transmitted signal is manually generated or otherwise subject to variations in rate of transmission, it is necessary to transmit a reference signal along with the code signal as described above. It is well within the teachings of the present invention, however, to provide a transmitting portion to the system wherein the code signal is automatically generated after insertion of the transducer programmer whereby the signal is generated at a uniform rate. When the transmission rate is fixed in this manner, it is no longer necessary to transmit a reference signal since an internal clock at the receive portion of the system can perform the same function and do so without requiring additional band width on the communication link. Thus, the reference signal detector 107 (see FIGS. 20–23) may be replaced by a clock which is initiated by a start signal and which thereafter continues to generate reference pulses at a rate commensurate with the fixed transmission rate of the transmitting portion of the system. A system of this description has the advantage of reducing the amount of information which must be transmitted over a communication link and thus reduce the chances of error which are inherent therein. This same system, however, has the disadvantage of depending on accurate rates of transmission and further requiring that the information established on a transducer programmer be transduced automatically rather than manually in order to maintain, within fixed limits, the rate at which information is generated and transmitted.

The various components of the above described system which have been shown only in the form of numbered blocks, e.g., code signal generator 13, reference signal generator 14, signal detection circuit 17, etc., are all individually well known in the art and do not, standing alone, represent invention.

I claim:

1. A mechanically programmed encoder system comprising in combination:

a transducer programmer having a plurality of code element locations and code elements secured at selected ones of said locations;

a program transducer for mechanically receiving said transducer programmer and operative to generate a serial code signal comprising a series of pulses representative of code elements on said transducer programmer;

reference signal generating means operative to generate a serial reference signal comprising a series of pulses which establish a reference for code signal pulses whereby the particular arrangement of code elements relative to code element locations on said transducer programmer is discernible;

a transponder programmer having a plurality of code element locations and code elements recurred at selected ones of said locations;

a programmer transponder for mechanically receiving said transponder programmer, said transponder disposed to receive serial code signals generated by said transducer, said transponder having a unique condition which it assumes only when the serial code signal which it receives corresponds to the arrangement of transponder programmer code elements relative to transponder code element locations; and a controlled line having switch means with two states associated therewith, said line associated with said transponder, said switch means responsive to said transponder assuming its unique condition to change states.

2. The encoder system of claim 1 wherein the relationship between the code signal and the reference signal is fixed by said transducer programmer.

3. The encoder system of claim 1 wherein said reference signal generating means includes reference signal elements disposed on said transducer programmer at prescribed locations relative to said code element locations.

4. The encoder system of claim 3 wherein said transducer programmer comprises an elongate body member and said code elements are projections removably secured at spaced intervals along one edge of said body member and said reference elements are projections secured along another edge of said body member at locations related to and fixed with respect to said code element locations.

5. The encoder system of claim 4 wherein said program transducer includes said reference signal generating means and wherein code signals and reference signals are generated by:

a pair of sound bars disposed in opposing relation to engage the projections of said transducer programmer as said programmer is being received by said transducer, said sound bars producing signals of distinguishable frequencies when engaged by programmer projections whereby code pulses are distinguishable from reference pulses.

6. The encoder system of claim 1 wherein said transponder is further described as having a start condition which it assumes before each new code signal is received, said transponder being responsive to a code signal which does not correspond to the code carried by said transponder programmer to assume its start condition.

7. The encoder system of claim 1 wherein said transponder is further described as having a start condition which it assumes before each new signal is received.

8. The encoder system of claim 2 wherein said transducer includes means operable to sense code elements and responsive thereto to generate a serial pulse signal and similarly operable to sense reference elements and generate a serial pulse signal responsive thereto wherein a signal pulse generated in response to a code element is distinguishable from a signal pulse generated in response to a reference element.

9. The encoder system of claim 8 wherein said programmer includes a body member which is generally opaque and said code elements and said reference elements comprise transparent windows through said body member.

10. The encoder system of claim 2 wherein said program transducer comprises;

a transducer housing having an opening formed therein for receiving said transducer programmer;

programmer element sensing means fixedly disposed within said housing near the opening thereof whereby elements are sensed as the programmer is inserted into said housing.

11. A transponder system for an encoder system wherein said transponder is operable to receive a signal of code pulses and reference pulses and compare the code pulses with the pattern of code elements on a transponder programmer associated with the transponder system, comprising in combination;

code signal detector means disposed to receive a signal and responsive to code pulses thereof to produce an output signal;

reference signal detector means disposed to receive a signal and responsive to reference pulses thereof to produce an output signal;

program transponder means operatively associated with a programmer having a plurality of code element locations at which elements may or may not be present and operable to interrogate the various code element locations thereof, said transponder means having a first input responsive to a signal to advance said transponder means whereby a different code element location of the programmer is interrogated, said transponder means having a second input responsive to a signal to clear said transponder means to a start position, said transponder means having an output at which a signal is established when said transponder means interrogates an element location at which an element is present;

signal delay means operatively disposed between the output of said reference signal detector means and the first input of said transponder means whereby said transponder means is advanced by each reference signal after a given time delay;

system clear detector means operable to detect system clear signals and responsive thereto to produce an output signal;

an OR gate disposed to receive output signals from said system clear detector means and responsive thereto to direct a signal to the second input of said transponder means whereby said transponder means is cleared to its start position;

an EXCLUSIVE OR gate disposed to receive at one input the output signals from said code signal detector means and at a second input the output signals from said transponder means, said EXCLUSIVE OR gate responsive to a signal at either of its inputs without a signal at the other to produce an output signal;

a controlled device operatively associated with said transponder means and said EXCLUSIVE OR gate whereby said controlled device is operated after said transponder means is advanced a given number of times from its start position without an output signal from said EXCLUSIVE OR gate being operative to prevent operation of said controlled device.

12. The transponder system of claim 11 wherein said OR gate is disposed to receive output signals from said EXCLUSIVE OR gate and responsive thereto to direct a signal to the second input of said transponder means whereby said transponder means is cleared to its start position.

13. The transponder system of claim 11 further comprising;

an AND gate disposed to receive at one input the output signals from said EXCLUSIVE OR gate and at its other input output signals from said reference signal detector, said AND gate operative to produce an output signal and direct it to said OR gate in response to a signal at both of its inputs at the same time.

14. The transponder system of claim 11 wherein said clear signal detector means comprises;

an AND gate disposed to receive the output signals from both said reference signal detector and said code signal detector and responsive to a signal from both at the same time to produce an output signal.

15. A mechanically programmed encoder system comprising in combination;

a transducer programmer including code elements of a selected space pattern and reference elements of a set space pattern;

a program transducer operable to mechanically receive said transducer programmer and responsive to relative movement therebetween to generate a serial signal which includes code signal pulses which are a function of the particular code element pattern of said transducer programmer, and reference signal pulses which are a function of its reference elements, said code elements and said reference elements being so arranged on said programmer that whenever a signal is generated by said transducer at least one reference pulse occurs between any two code pulses;

signal detection means disposed to receive the signal generated by said transducer, said detection means responsive to a reference pulse to generate an advance signal and responsive to a code pulse to generate a transducer code signal;

a transponder programmer including a plurality of code element locations and code elements at selected element locations to achieve a selected code element pattern;

a program transponder operable to mechanically receive said transponder programmer and including code element sensing means operable to sequentially sense code element locations and responsive to a code element to generate a transponder code signal, said transponder disposed to receive advance signals from said element sensing means to a new element location, said transponder further including clear means operable in response to a signal to prevent further advancement of said sensing means, said transponder having a unique condition which is established only after said sensing means is advanced a prescribed number of times between any two operations of said clear means; and gate means disposed to receive transducer code signals from said signal detection means and transponder code signals from said sensing means, said gate responsive to receipt of one signal only, indicating a lack of correspondence between the signal from the transducer and the code element pattern on said transponder programmer to generate a clear signal and direct the clear signal to said clear means.

References Cited

UNITED STATES PATENTS

| | | | |
|---|---|---|---|
| 2,637,844 | 5/1953 | Thompson | 340—301 |
| 2,740,106 | 3/1956 | Phelps | 340—147 |
| 2,903,675 | 9/1959 | Downey et al. | 340—287 XR |
| 2,948,886 | 8/1960 | McIlwain | 340—365 |
| 3,327,290 | 6/1967 | English | 340—164 |
| 1,662,613 | 3/1928 | Laynor | 70—398 XR |
| 2,376,846 | 5/1945 | Field et al. | 340—365 XR |
| 2,671,167 | 3/1954 | Kulansky. | |
| 2,832,071 | 4/1958 | Hendricks | 340—164 XR |
| 3,105,123 | 9/1963 | De Fina. | |
| 3,234,516 | 2/1966 | Miller | 340—164 |
| 3,355,631 | 11/1967 | Christiansen | 317—134 |

DONALD J. YUSKO, Primary Examiner

U.S. Cl. X.R.

70—278; 340—164